US012734509B2

(12) United States Patent
Lee et al.

(10) Patent No.: US 12,734,509 B2
(45) Date of Patent: Sep. 15, 2026

(54) COPPER-BASED CATALYST FOR REVERSE WATER GAS SHIFT REACTION INCLUDING GAS-PERMEABLE AMORPHOUS SHELL FORMED BY STRONG METAL-SUPPORT INTERACTION

(71) Applicants: Korea Advanced Institute of Science and Technology, Daejeon (KR); POSTECH Research and Business Development Foundation, Pohang-si (KR)

(72) Inventors: Hyun Joo Lee, Daejeon (KR); Gun Joo Kim, Daejeon (KR); Yong Tae Kim, Pohang-si (KR)

(73) Assignees: KOREA ADVANCED INSTITUTE OF SCIENCE AND TECHNOLOGY, Daejeon (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 508 days.

(21) Appl. No.: 18/231,842

(22) Filed: Aug. 9, 2023

(65) Prior Publication Data

US 2024/0058794 A1 Feb. 22, 2024

(30) Foreign Application Priority Data

Aug. 16, 2022 (KR) ........................ 10-2022-0102342
Jun. 19, 2023 (KR) ........................ 10-2023-0077934

(51) Int. Cl.
*B01J 23/83* (2006.01)
*B01J 6/00* (2006.01)
(Continued)

(52) U.S. Cl.
CPC ............... *B01J 23/83* (2013.01); *B01J 6/001* (2013.01); *B01J 23/72* (2013.01); *B01J 35/19* (2024.01);
(Continued)

(58) Field of Classification Search
CPC ... B01J 6/001; B01J 23/72; B01J 23/83; B01J 35/19; B01J 35/45; B01J 35/505;
(Continued)

(56) References Cited

U.S. PATENT DOCUMENTS 11,661,520 B1 * 5/2023 Phillips ................ C09D 163/00 427/407.1
2019/0374929 A1 * 12/2019 Wyman .................... B01J 37/18
2021/0355073 A1 * 11/2021 Sun .......................... B01J 23/72

FOREIGN PATENT DOCUMENTS

CN 107774269 A * 3/2018 .............. B01J 37/08

OTHER PUBLICATIONS

WIPO machine translation of Dong et al (CN 107774269). (Year: 2018).*

* cited by examiner

*Primary Examiner* — Brian A McCaig
(74) *Attorney, Agent, or Firm* — LEX IP MEISTER, PLLC

(57) ABSTRACT

The present disclosure relates to a copper-based catalyst for reverse water gas reaction including a gas-permeable amorphous shell formed by strong metal-support interaction. The inventors of the present disclosure synthesized a copper-ceria solid solution and then adjusted the surface defect sites of the solid solution, thereby producing a catalyst including enhanced surface defect sites and having a gas-permeable amorphous shell structure formed on each copper particle.
(Continued)

When the catalyst production method according to the present disclosure is used, it is possible to synthesize a catalyst including a structure consisting only of very small Cu particles encapsulated by surface shells and Cu sites incorporated into the $CeO_2$ lattice structure. When the synthesized catalyst is used in the RWGS reaction, it exhibits excellent low-temperature activity, high activity and durability, compared to conventional precious metal catalysts. In addition, even when the catalyst of the present disclosure is supported on a monolith and used to perform the RWGS reaction on a bench scale, it exhibits high activity, $CO_2$ conversion and durability, which are comparable with those in the laboratory scale, indicating at it may be applied to an actual process.

12 Claims, 11 Drawing Sheets

(51) Int. Cl.
*B01J 23/72* (2006.01)
*B01J 35/00* (2006.01)
*B01J 35/50* (2024.01)
*B01J 37/03* (2006.01)
*B01J 37/04* (2006.01)

(52) U.S. Cl.
CPC ........... *B01J 35/505* (2024.01); *B01J 37/031* (2013.01); *B01J 37/04* (2013.01); *B01J 2235/00* (2024.01); *B01J 2235/15* (2024.01); *B01J 2235/30* (2024.01)

(58) Field of Classification Search
CPC ...... B01J 37/031; B01J 37/04; B01J 2235/00; B01J 2235/15; B01J 2235/30
See application file for complete search history.

[FIG. 1]
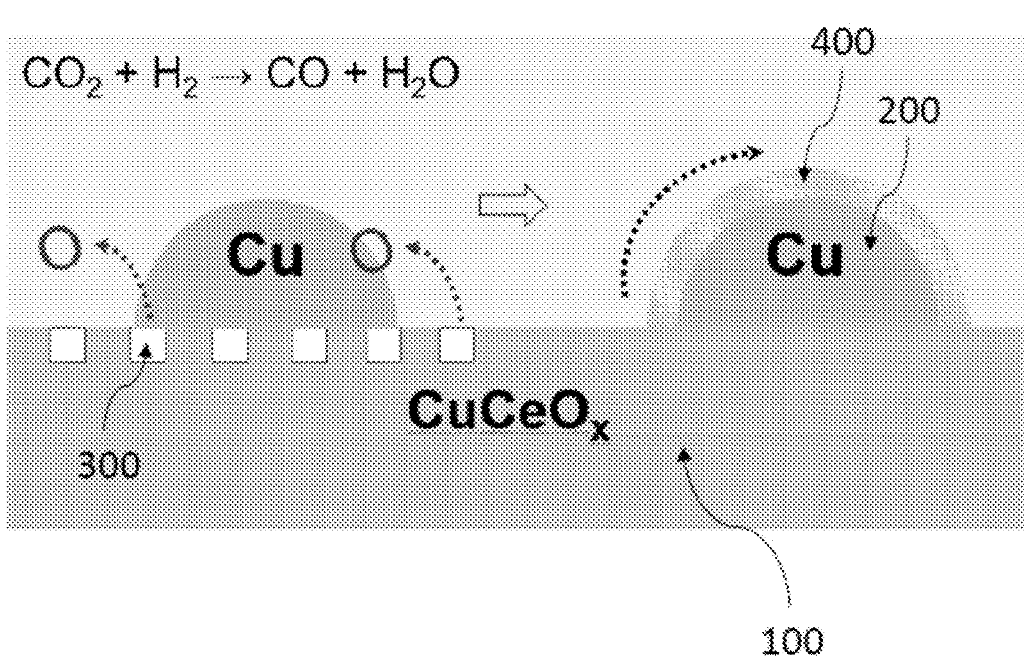

[FIG. 2]
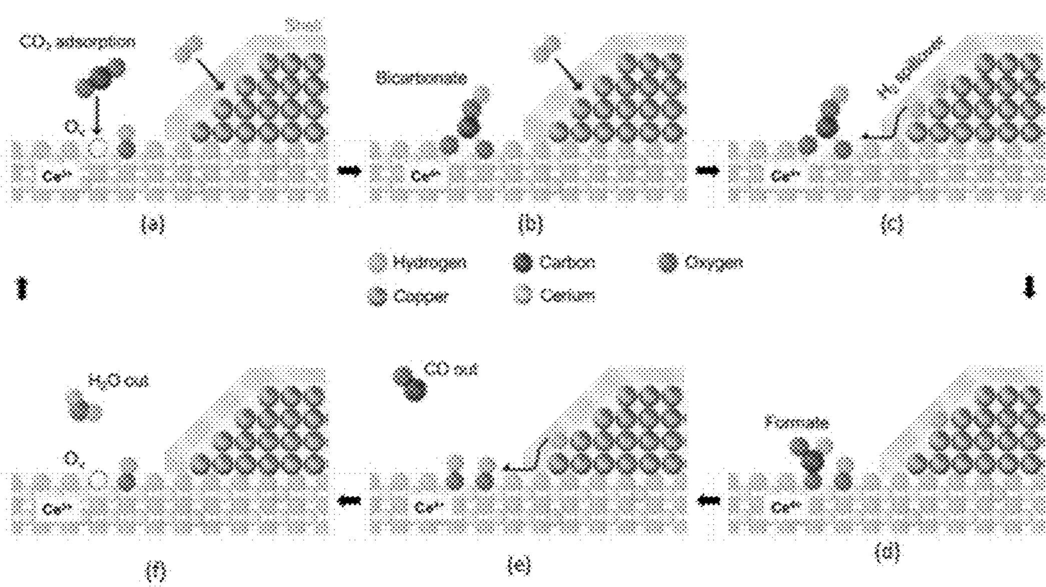

[FIG. 3]
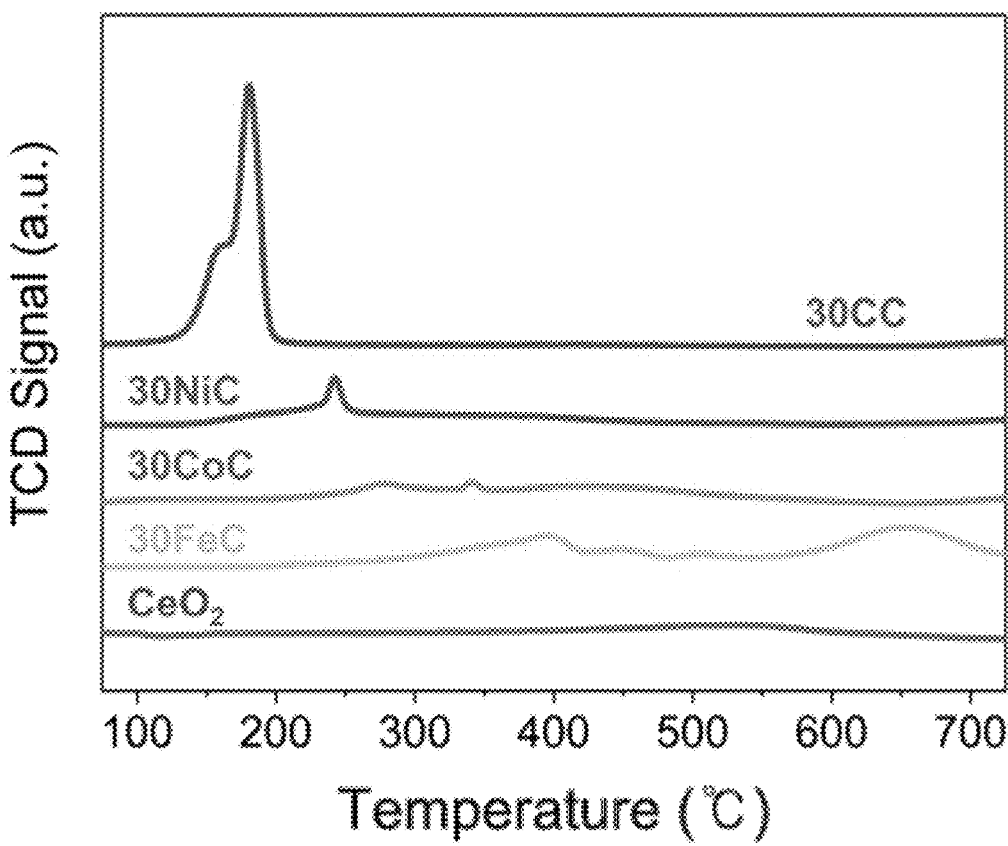

[FIG. 4]
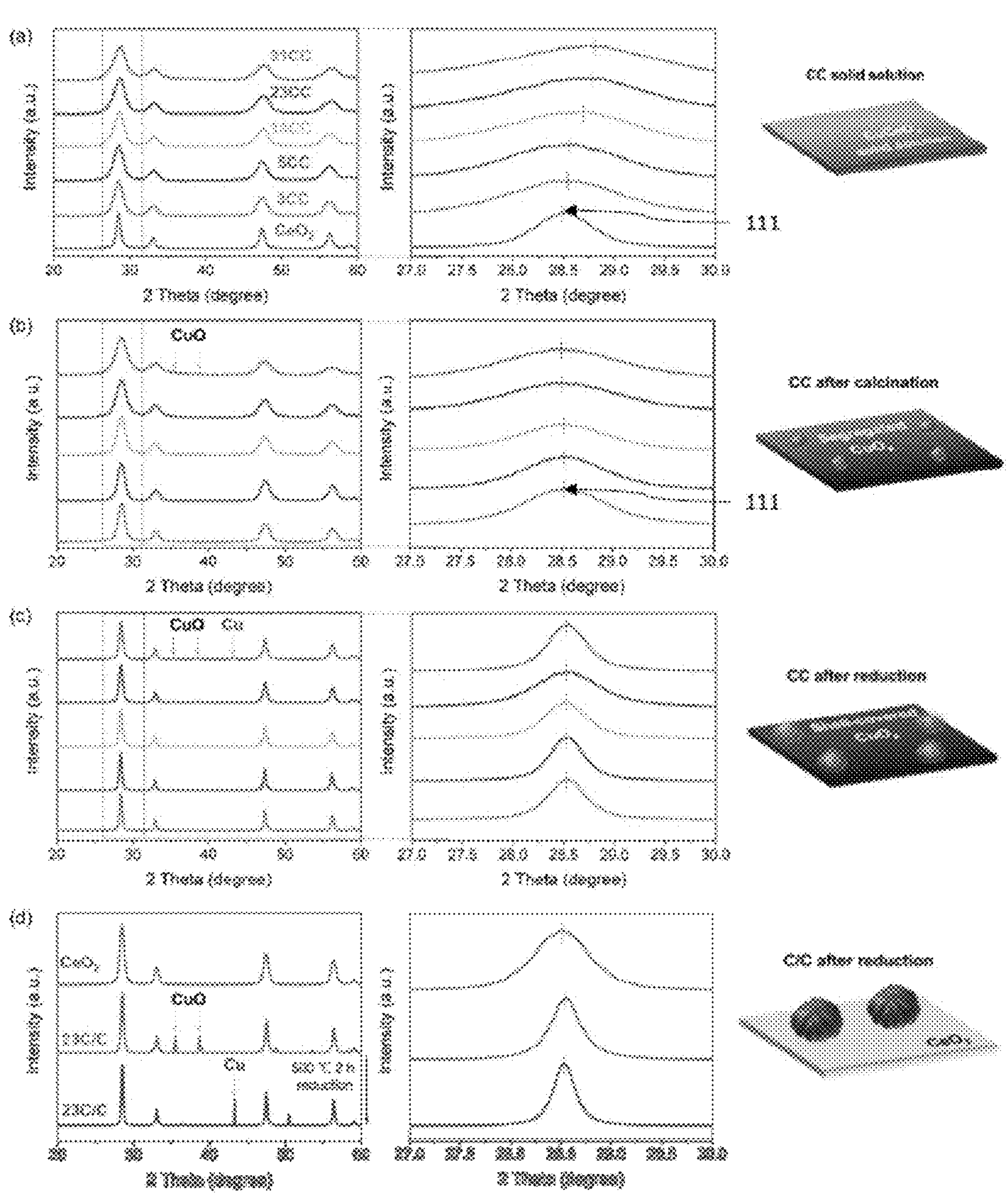

[FIG. 5]
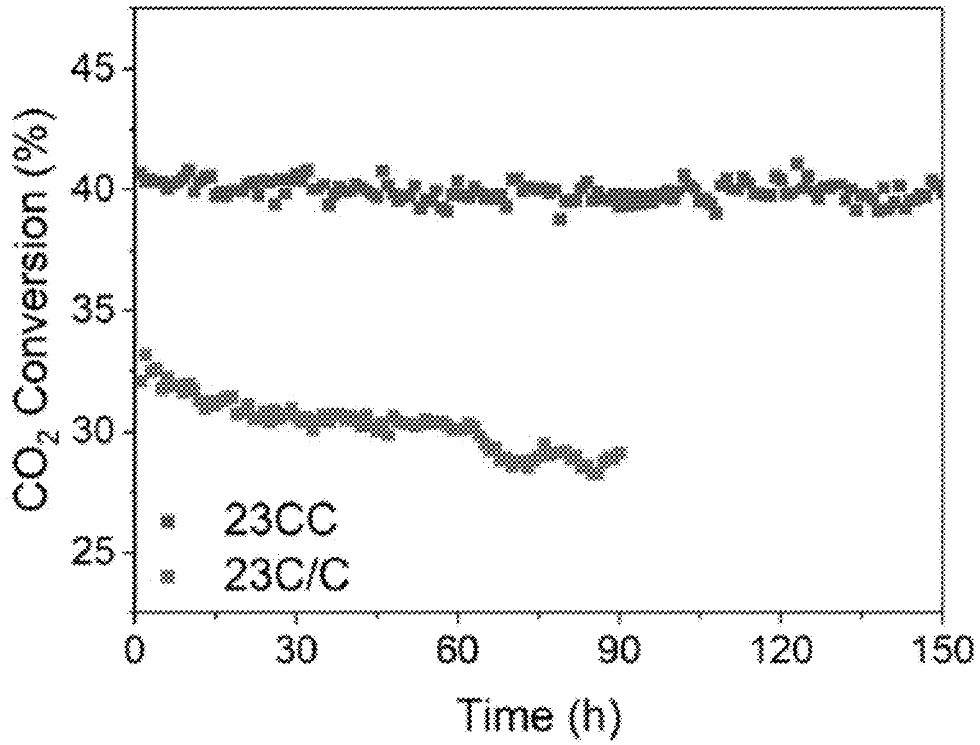

[FIG. 6]
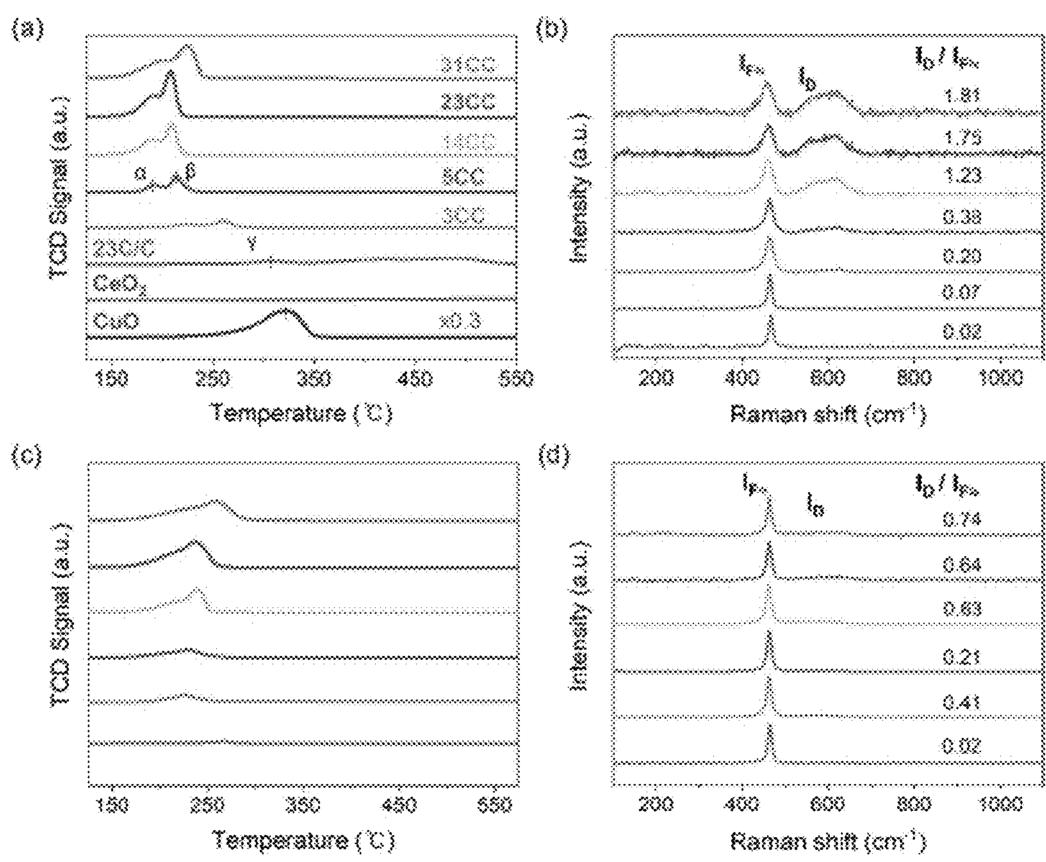

[FIG. 7]
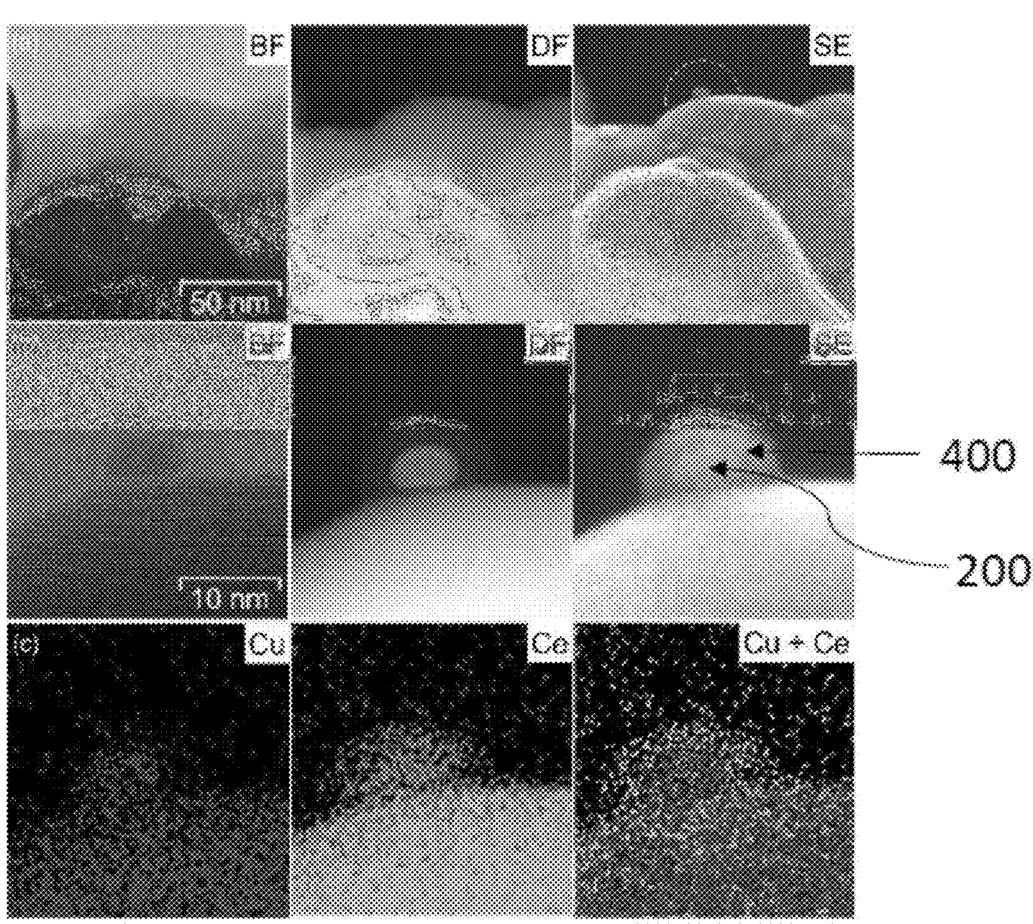

[FIG. 8]
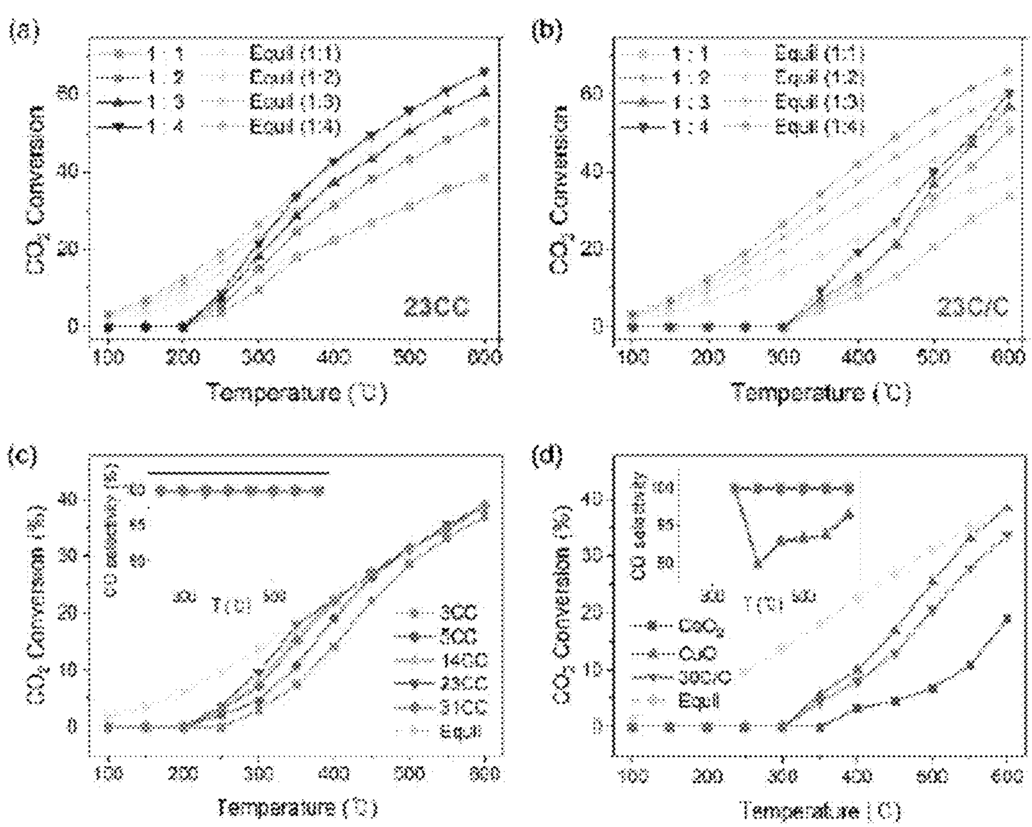

[FIG. 9]
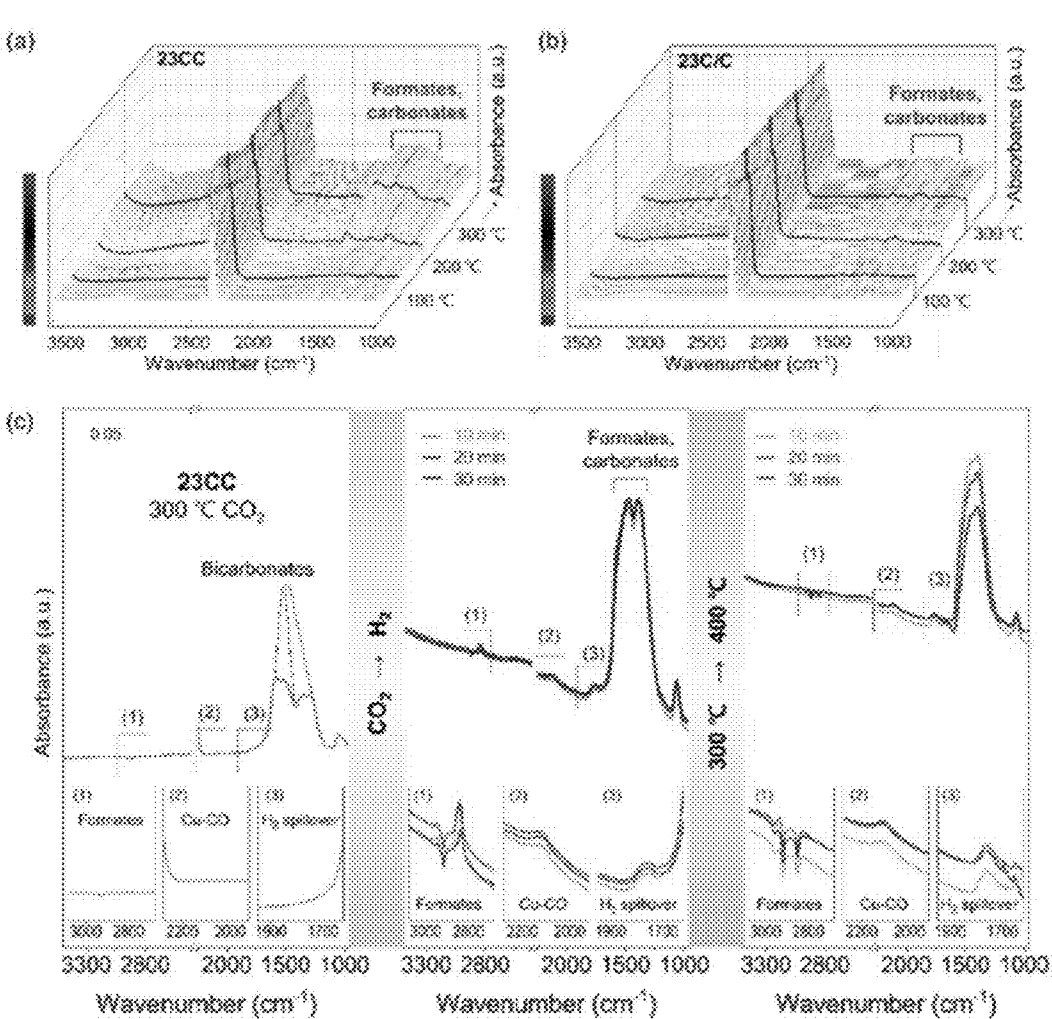

[FIG. 10]
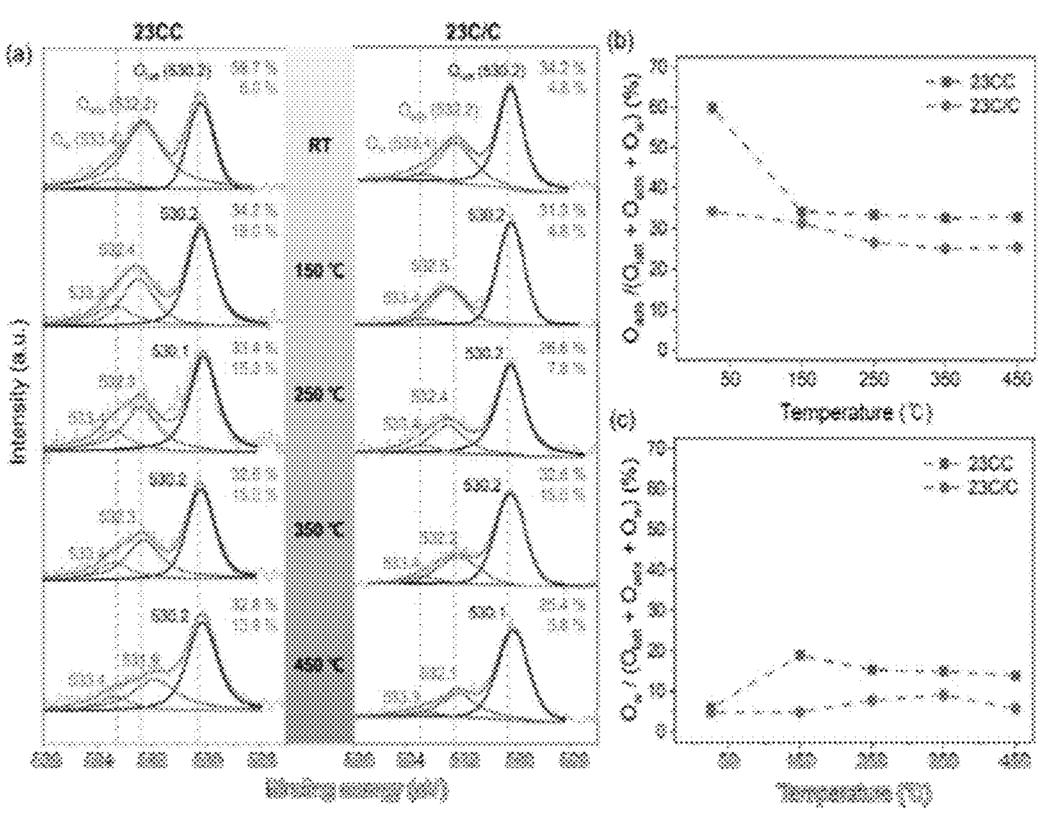

[FIG. 11]
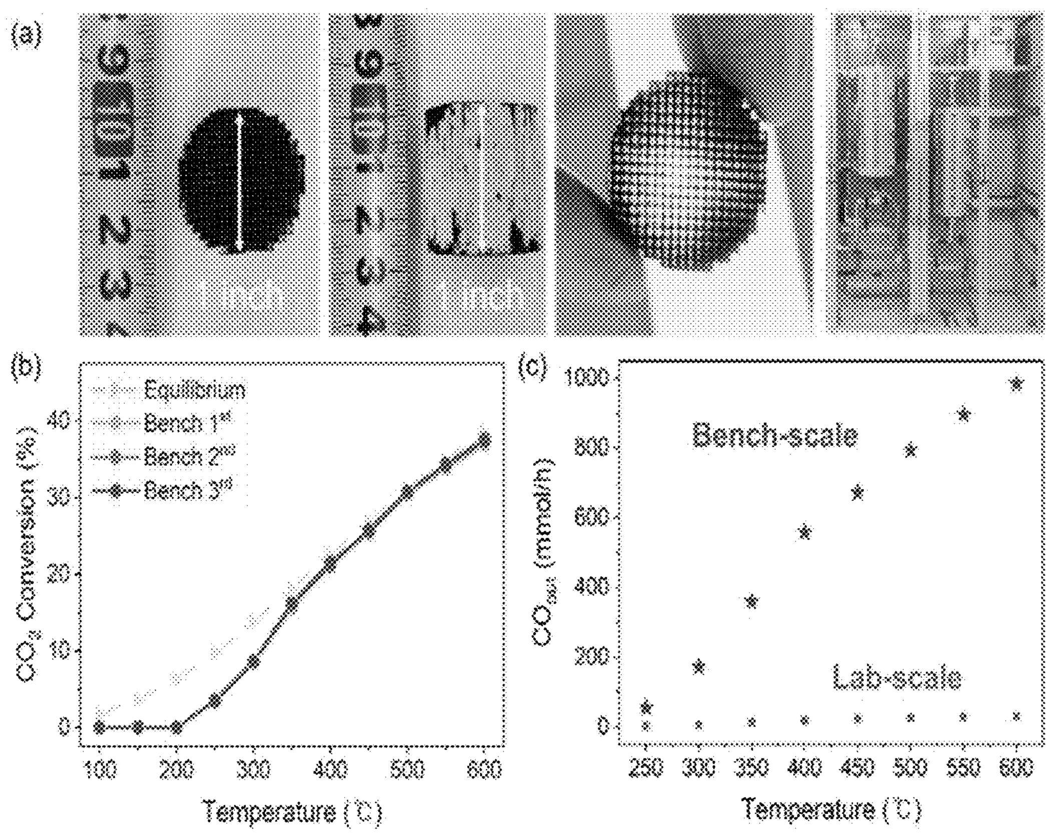

COPPER-BASED CATALYST FOR REVERSE WATER GAS SHIFT REACTION INCLUDING GAS-PERMEABLE AMORPHOUS SHELL FORMED BY STRONG METAL-SUPPORT INTERACTION

BACKGROUND

1. Technical Field

The present invention relates to a catalyst for the reverse water gas reaction, which includes a gas-permeable amorphous shell formed by strong metal-support interaction and is based on copper.

2. Related Art

For the reverse water gas shift (RWGS) reaction, high-temperature reactions are required to achieve a high carbon dioxide conversion rate and carbon monoxide selectivity. The reaction involves injecting carbon dioxide and hydrogen to produce carbon monoxide and water. At low temperatures, a predominant side reaction occurs, converting carbon dioxide and hydrogen into methane. At high temperatures, active sites deteriorate in a highly reducing atmosphere. Therefore, it is challenging to achieve both high reactivity and high selectivity to carbon monoxide. Consequently, it is crucial to either provide durability to active sites at high temperatures and in a reducing atmosphere or achieve high reactivity and selectivity at low temperatures in order for the reaction to be viable in practical processes.

To develop heterogeneous catalysts with superior performance in various surface reactions, research on controlling the interface between metal nanoparticles and oxide supports has been actively pursued. Typically, small nanoparticles with a size of ≤10 nm are dispersed on the support, but they often sinter into larger particles during the reaction, posing durability issues. To address this problem, significant attention has been given to the concept of strong metal-support interaction (SMSI), as it can form oxide shells over metal nanoparticles, effectively preventing being sintered.

The oxide shell forms when surface oxygen species are activated. After extracting mobile surface oxygen species, sub-stoichiometric metal oxide species are formed and migrate onto metal nanoparticles, creating overlayers. Usually, this process takes place in a high-temperature reducing environment. However, metal nanoparticles frequently sinter before shell formation occurs. Additionally, the crystalline nature of the shell typically renders it gas-impermeable, leading to a loss of catalytic activity.

Gas-permeable shell structures on small nanoparticles have primarily been observed in precious metal nanoparticles, possibly due to efficient activation of oxygen species at the interface between precious metal nanoparticles and the metal oxide support. Non-precious metal catalysts with amorphous shell structures hold particular promise for large-scale industrial processes. Therefore, there is a growing need to develop non-precious metal catalysts with amorphous shell structures.

PRIOR ART DOCUMENTS

Patent Documents

Korean Patent No. 10-1682117 (registered on Nov. 28, 2016)

SUMMARY

The inventors of the present invention have conducted extensive research efforts to develop a non-precious metal catalyst with an amorphous shell structure that can be used in large-scale industrial processes. As a result, the inventors have discovered that when Cu-doped $CeO_2$ is used, Cu nanoparticles deposited on $CeO_2$ can form a gas-permeable amorphous shell without undergoing sintering. The catalyst thus obtained exhibits excellent reactivity and durability in the reverse water gas shift reaction, leading to the completion of the present invention.

Therefore, an objective of the present invention is to provide a complex oxide catalyst comprising a metal oxide support, such as $CeO_2$, and copper. Particularly, the present invention enables the provision of a complex oxide catalyst that exhibits high reactivity and selectivity while satisfying favorable temperature conditions in large-scale industrial processes.

Another objective of the present invention is to provide a catalyst ink composition that includes the complex oxide catalyst.

Yet another objective of the present invention is to provide a method for producing a complex oxide catalyst.

However, the objectives of the present invention are not limited to the above-described objectives and will become clearer from the following description as detailed in the specification below.

According to one aspect of the present disclosure, the present disclosure provides a complex oxide catalyst including a metal oxide support and copper.

In this case, in one embodiment of the present disclosure, the metal oxide may be $TiO_2$ or $CeO_2$.

Meanwhile, in one embodiment of the present disclosure, the copper is present as particles on the surface of the catalyst.

In one embodiment of the present disclosure, the particles are nanoparticles.

In one embodiment of the present disclosure, the particles have an average particle diameter of 1 to 150 nm, 1 to 100 nm, 1 to 80 nm, 1 to 50 nm, 1 to 40 nm, 1 to 30 nm, 1 to 20 nm, or 1 to 10 nm, without being limited thereto.

In one embodiment of the present disclosure, the copper in the particles includes copper oxide. The copper oxide is $Cu_2O$, CuO, or $Cu_2O_3$.

In one embodiment of the present disclosure, each of the particles is encapsulated by a shell composed of the metal oxide support. In one embodiment of the present disclosure, the shell exhibits gas permeability.

In one embodiment of the present disclosure, the copper may be present in a $CeO_2$ lattice structure.

In one embodiment of the present disclosure, the complex oxide catalyst is for reverse water gas shift (RWGS) reaction, without being limited thereto.

According to another aspect of the present disclosure, the present disclosure provides a catalyst composition including the complex oxide catalyst.

In one embodiment of the present disclosure, the catalyst composition further includes a stabilizer, a promoter, or a binder.

The stabilizer may be polyvinylpyrrolidone (PVP), polyvinylalcohol (PVA) or cetyltrimethylammonium bromide (CTAB), and may include, without limitation, any stabilizer for a catalyst known in the art (see Ott, L. S., & Finke, R. G. (2007). Transition-metal nanocluster stabilization for catalysis: a critical review of ranking methods and putative stabilizers. Coordination Chemistry Reviews, 251(9-10), 1075-1100).

The promoter may be a reducible transition metal oxide, such as $La_2O_3$ or $MoO_x$; or an oxophilic metal such as rhenium (Re); or an alkali metal such as lithium (Li), sodium (Na), $Na_2O$, potassium (K), $K_2O$, or $KO_x$, without being necessarily limited thereto.

The binder may be an inorganic binder or an organic binder, without being necessarily limited thereto. For example, the inorganic binder may be clay, water glass, silica, titania, or zirconia. As another example, the organic binder may be polyvinyl alcohol, polyurethane, acrylic resin, melamine resin, or epoxy resin. As another example, the binder may be silica, a siloxane polymer, silicone resin, aluminum phosphate, an acrylic binder, zeolite, rare earth element oxide, fine glass powder, or a polymer. The rare earth element may be Sc, Y, or La.

In one embodiment of the present disclosure, the catalyst composition includes aluminum oxide particles. The aluminum oxide particles are used as a binder.

In one embodiment of the present disclosure, the catalyst composition includes the aluminum oxide particles in an amount 50 to 80% (w/w), 60 to 80% (w/w), 65 to 80% (w/w), 70 to 80% (w/w), 72 to 80% (w/w), or 75 to 80% (w/w). The aluminum oxide particles have an average diameter of 20 to 50 μm.

In one embodiment of the present disclosure, the catalyst composition includes sodium oxide.

In one embodiment of the present disclosure, the catalyst composition may be a catalyst ink composition, and may be used to impart catalytic function a specific article by coating.

According to still another aspect of the present disclosure, the present disclosure provides a method for selective production of carbon monoxide by reverse water gas shift (RWGS) reaction, the method including bringing the catalyst composition according to one embodiment of the present disclosure into contact with a mixed gas including carbon dioxide gas and hydrogen gas.

In one embodiment of the present disclosure, the mixed gas includes nitrogen gas, carbon dioxide gas, and hydrogen gas.

In one embodiment of the present disclosure, the volume ratio between the carbon dioxide gas and the hydrogen gas is 1:1 to 1:4.

In another embodiment of the present disclosure, the volume ratio between the carbon dioxide gas and the hydrogen gas is 1:1, 1:2, 1:3, or 1:4.

In another embodiment of the present disclosure, the volume ratio between the carbon dioxide gas and the hydrogen gas is 1:3.

In another embodiment of the present disclosure, the volume ratio between the carbon dioxide gas and the hydrogen gas is 1:1.

According to yet another aspect of the present disclosure, the present disclosure provides a method for producing a complex oxide catalyst, the method including steps of:

(a) dissolving a metal oxide precursor and copper oxide in water;
(b) adjusting the pH of the solution to 8 to 9 and stirring the pH-adjusted solution to form a precipitate;
(c) drying the precipitate to form a solid solution;
(d) calcining the solid solution; and
(e) reducing the calcined solid solution under a hydrogen atmosphere.

In one embodiment of the present disclosure, steps (a) and (b) are steps in which co-precipitation occurs.

In one embodiment of the present disclosure, the metal oxide is cerium oxide or titanium oxide. The cerium oxide is $CeO_2$. The titanium oxide is $TiO_2$.

In one embodiment of the present disclosure, 5 to 50 mg of the copper oxide is dissolved in 90 mL of water, without being limited thereto. For example, 5 mg, 10 mg, 15 mg, 20 mg, 25 mg, 30 mg, 35 mg, 40 mg, 45 mg, or 50 mg of the copper oxide may be dissolved in 90 mL of water, or an amount (mg) of the copper oxide, which is between the above values, may be dissolved.

In one embodiment of the present disclosure, the stirring in step (b) is performed for 3 to 10 hours.

In one embodiment of the present disclosure, the precipitate in step (c) is filtered before drying.

In one embodiment of the present disclosure, the drying in step (c) is performed for 6 hours to 12 hours, 6 hours to 10 hours, 6 hours to 8 hours, 8 hours to 12 hours, or 8 hours to 10 hours.

In one embodiment of the present disclosure, step (d) of calcining the solid solution is a step of oxidizing the metal oxide support and copper.

In one embodiment of the present disclosure, step (d) of calcining the solid solution is performed at a temperature of 400 to 600° C., 400 to 550° C., 400 to 500° C., 450 to 600° C., 450 to 550° C., 450 to 500° C., 500 to 600° C., or 500 to 550° C., without being limited thereto.

In one embodiment of the present disclosure, step (d) of calcining the solid solution is performed for 2 hours to 6 hours, 2 hours to 5 hours, 2 hours to 4 hours, 2 hours to 3 hours, 3 hours to 6 hours, 3 hours to 5 hours, or 3 hours to 4 hours, without being limited thereto.

In one embodiment of the present disclosure, step (e) of reducing the calcined solid solution is a step in which the metal oxide forms a shell structure on the surface of the copper particle.

The reducing step may be performed together with heat treatment.

The reducing heat treatment is performed at a temperature of 200° C. to 700° C., 200° C. to 600° C., 200° C. to 500° C., 200° C. to 400° C., 200° C. to 300° C., 300° C. to 700° C., 300° C. to 600° C., 300° C. to 500° C., 300° C. to 400° C., 400° C. to 700° C., 400° C. to 600° C., 400° C. to 500° C., 500° C. to 700° C., 500° C. to 600° C., or 600° C. to 700° C. under an atmosphere of hydrogen gas and inert gas.

In another embodiment of the present disclosure, the reducing heat treatment is performed at 500° C. under an atmosphere of hydrogen gas and inert gas.

In one embodiment of the present disclosure, the volume percentage of the hydrogen gas relative to the inert gas is 5% (v/v) to 20% (v/v).

In another embodiment of the present disclosure, the volume percentage of the hydrogen gas relative to the inert gas is 5% (v/v) to 20% (v/v), 5% (v/v) to 15% (v/v), 5% (v/v) to 10% (v/v), 10% (v/v) to 20% (v/v), 10% (v/v) to 15% (v/v), or 15% (v/v) to 20% (v/v).

In one specific embodiment of the present disclosure, the volume percentage of the hydrogen gas relative to the inert gas is 10% (v/v).

The inventors of the present invention have discovered that when Cu nanoparticles are uniformly present on the surface of a CuCeOx solid solution, an amorphous shell can be formed on the Cu nanoparticles during CO2 hydrogenation. On the other hand, nanoparticles deposited on bare CeO2 did not form such an amorphous shell. Furthermore, it was observed that while conventional Cu/CeO2 catalysts reached the temperature around 600° C., which is the thermodynamically feasible CO2 conversion limit, catalysts with the mentioned amorphous shell reached the CO2 conversion limit at a much lower temperature of around 350° C. due to enhanced CO2 activation and H2 spillover. The amorphous shell of the present invention maintained high reactivity while preserving the Cu nanoparticles. Additionally, it was found that such non-precious metal catalysts can be utilized in large-scale processes.

BRIEF DESCRIPTION OF THE DRAWINGS

FIG. 1 is a schematic view of a complex oxide catalyst according to one embodiment of the present disclosure.

FIG. 2 illustrates the $CO_2$ hydrogenation mechanism according to one embodiment of the present disclosure.

FIG. 3 shows the results of measuring surface oxygen mobility in ceria shells doped with Cu, Ni, Co, and Fe, respectively. Upon doping with Cu, large reduction peaks appeared at a low temperature, indicating that surface oxygen species can be easily activated by reduction. 23CC, 23NiC, 23CoC and 23FeC denote 23 atomic % $CeO_2$ doped with Cu, Ni, Co, and Fe, respectively.

FIG. 4 shows the results of examination by X-ray diffraction (XRD) and high resolution X-ray scattering (HR-XRS) and a schematic view of a shell structure for each step of synthesizing a complex oxide catalyst according to one embodiment of the present disclosure. FIG. 4(*a*) shows XRD and HR-XRS results of CC in a solid solution state and $CeO_2$. FIG. 4(*b*) shows the results obtained after calcination at 500° C. for 4 hours in air. FIG. 4(*c*) shows the results obtained after reduction at 500° C. for 2 hours with 10% $H_2$ (balance $N_2$). FIG. 4(*d*) shows XRD and HR-XRS results of 23C/C after calcination and further reduction. In this case, 3CC, 5CC, 14CC, 23CC and 31CC denote doping with copper at 3, 5, 14, 23, and 31 at % (atomic weight percent), respectively.

FIG. 5 shows the results of performing a long-term durability test for the composite oxide catalyst according to one embodiment of the present disclosure at 600° C. for 150 hours. The reaction was performed using 23CC or 23C/C in a gas composition of $CO_2$:$H_2$=1:1 and WHSV=48,000 mL/$g_{cat}$·h.

FIG. 6 shows the results of characterization for surface oxygen species in the composite oxide catalyst according to one embodiment of the present disclosure. FIG. 6(*a*) shows $H_2$-TPR results, and FIG. 6(*b*) shows Raman spectra obtained before reduction. FIG. 6(*c*) shows $H_2$-TPR results, and FIG. 6(*d*) shows Raman spectra obtained after reduction for the CC catalyst, the 23C/C catalyst and the $CeO_2$ support.

FIG. 7 depicts TEM images showing an amorphous shell on a Cu nanoparticle. FIG. 7(*a*) shows TEM images of 23CC, FIG. 7(*b*) shows enlarged TEM images of the particle designated with a yellow circle in FIG. 7(*a*), and FIG. 7(*c*) shows the corresponding EDS mapping of Cu and Ce. The images were collected after a durability test at 600° C. for 150 hours in a gas composition of $CO_2$:$H_2$:$N_2$=1:1:2. They were obtained simultaneously by bright field (BF), dark field (DF), and secondary electron (SE) modes.

FIG. 8 depicts graphs hydrogenation activity according to one embodiment of the present disclosure. In particular, FIG. 8 shows $CO_2$ conversion and CO selectivity for 23CC (FIG. 8(*a*)) and 23C/C (FIG. 8(*b*)) performed under various $CO_2$:$H_2$ ratios. $CO_2$ conversion and CO selectivity for CC catalysts (FIG. 8(*c*)), 23C/C, $CeO_2$, and CuO (FIG. 8(*d*)). In this case, the reaction was carried out in a gas composition of $CO_2$:$H_2$:$N_2$=1:1:2 with WHSV=48,000 mL/$g_{cat}$·h.

FIG. 9 shows the results of characterizing surface intermediates on 23CC and 23C/C according to one embodiment of the present disclosure. FIGS. 9(*a*) and 9(*b*) are in-situ DRIFT spectra collected in a gas composition of $CO_2$:$H_2$=1:3 for 23CC and 23C/C. In this case, injection was started at 25° C., raised to 300° C. at a rate of 5° C./min, and maintained for 30 min at 300° C. The spectra were obtained every minute. FIG. 9(*c*) shows in-situ DRIFT spectra collected upon gas-control for 23CC. In this case, the catalyst was heated up to 300° C. in 100% Ar, and then the gas was changed to 10% $CO_2$/Ar (grey). The gaseous $CO_2$ was removed, and then the gas was changed into 10% $H_2$/Ar (red). Then, the temperature increased to 400° C. (blue).

FIG. 10 depicts graphs showing the results of characterizing surface oxygen species on 23CC and 23C/C. FIG. 10(*a*) shows NAP-XPS results of O 1s for 23CC and 23C/C obtained at room temperature, 150° C., 250° C., 350° C., and 450° C. Positions and area ratios of each peak are shown. The total pressure was 1 Torr, and the gas composition was $CO_2$:$H_2$=1:3. FIGS. 10(*b*) and 10(*c*) are graphs showing the changes in the ratio of oxygen peaks for $O_{ads}$ (b) and $O_w$ (c) with increasing temperature.

FIG. 11 shows the bench scale performance of 23CC according to one embodiment of the present disclosure. FIG. 11(*a*) shows images of a honeycomb monolith and a bench reactor. The monolith was coated with 23CC catalyst. In the bench reactor, the reaction occurred in a left furnace, while the gas inlet was pre-heated in a right furnace. FIG. 11(*b*) shows the $CO_2$ hydrogenation performance of 23CC in a bench reactor for three repeated reactions. FIG. 11(*c*) is a graph showing the results of comparing actual CO productivity of 23CC for a lab-scale reactor and a bench reactor. Numbers in the legend represent WHSV at laboratory scale. The WHSV under this condition was estimated to be 48,507 mL/$g_{cat}$·h, which was similar to that in the condition used in the lab-scale reactor (48,000 mL/$g_{cat}$·h).

DETAILED DESCRIPTION

Hereinafter, embodiments of the present disclosure will be described in detail with reference to the accompanying drawings. However, the present disclosure is not limited to the embodiments disclosed below, but can be embodied in a variety of different forms. Rather, these embodiments are provided so that this disclosure will be thorough and complete, and will fully convey the scope of the present disclosure to those skilled in the art. In addition, in the drawings, the sizes of components may be exaggerated or reduced for convenience of explanation.

However, the embodiments disclosed below are provided so that the present disclosure can be sufficiently understood by those skilled in the art. These embodiments may be modified in various other forms, and the scope of the present disclosure is limited to the embodiments described below.

Throughout the present specification, it is to be understood that when any part is referred to as "including" any component, it does not exclude other components, but may further include other components, unless otherwise specified.

The above-described objects, features and advantages of the present disclosure will become more apparent from the following description in conjunction with the accompanying drawings, and thus those skilled in the art to which the disclosure belongs will be able to easily implement the technical idea of the present disclosure.

In the present specification, the term "catalytic complex" may also be used for a complex including a support and a catalytic amount of a metal deposited on a part or all of the support. The term "catalytic complex" may be used interchangeably with the term "catalyst". The catalytic complex may be a supported metal catalyst.

As used herein, the term "metal-support interaction" means the direct effect of the support on the chemical adsorption and catalytic properties of the supported metal. The metal-support interaction in the present disclosure is specifically strong metal-support interaction (SMSI).

As used herein, the term "strong metal-support interaction (SMSI)" is meant to encompass changes in chemical adsorption properties and catalytic action that occur when the metal supported on the support is subjected to reduction treatment at high temperatures. Specifically, as used herein, the term "SMSI" is meant to encompass reversible surface migration of partially reduced oxide species.

As used herein, the term "solid solution" refers to a solution in which one or more solutes in any solvent are mixed and exist in a solid state. Specifically, the solid solution in the present disclosure may be a solid solution in which a copper solute exists in a ceria solvent.

As used herein, the term "reverse water gas shift (RWGS) reaction" refers to an endothermic reaction that produces either carbon monoxide (CO) and water ($H_2O$) as products or carbon monoxide (CO), water ($H_2O$) and methane as products from carbon dioxide ($CO_2$) and hydrogen ($H_2$) as reactants. The products may be selected depending on the thermodynamic equilibrium. The main reaction of the reverse water gas shift reaction is $CO_2$ (g)+$H_2$ (g)↔CO (g)+$H_2O$ (g), and a methanation reaction occurs as a side reaction thereof.

As used herein, the term "calcination" means heating to high temperatures in air or oxygen. In the present disclosure, heat treatment (i.e., calcination) was performed to oxidize the catalyst at high temperatures in air.

The inventors of the present disclosure have found that, when Cu nanoparticles are uniformly present on the surface of a $CuCeO_x$ solid solution, an amorphous shell may be formed on the Cu nanoparticles during hydrogenation of $CO_2$. On the other hand, this amorphous shell was not formed on nanoparticles deposited on bare $CeO_2$. In addition, it could be seen that, although a conventional Cu/$CeO_2$ catalyst approached the thermodynamically possible $CO_2$ conversion limit at about 600° C., the catalyst having the above-described amorphous shell formed thereon reached the limit at a much lower temperature of about 350° C. due to enhanced $CO_2$ activation and $H_2$ spillover. The amorphous shell of the present disclosure maintained high activity while preserving the Cu nanoparticles. In addition, it could be seen that this non-precious metal catalyst may be used even in large-scale processes.

Hereinafter, a complex oxide catalyst according to one embodiment of the present disclosure will be described with reference to FIG. 1.

Referring to FIG. 1, a complex oxide catalyst according to one embodiment of the present disclosure is a metal-oxide solid solution including a metal oxide support 100 and copper, wherein the copper has copper nanoparticles 200 on the surface of the metal oxide support. This metal-oxide solid solution has oxygen vacancy ($O_v$) sites 300, and an amorphous shell 400 may form on the surface of each copper nanoparticle to encapsulate the surface of each copper nanoparticle.

The metal oxide support 100 may be cerium oxide or titanium oxide, and the copper nanoparticles 200 on the surface may preferably have a size of 10 nm or less.

The amorphous shell 400 is preferably composed of the metal oxide support encapsulating the copper nanoparticles on the surface, and may be induced by formates, which are intermediates of the reverse water gas shift reaction. In addition, the amorphous shell 400 may exhibit gas permeability.

In addition, the copper nanoparticles 200 may be present in the lattice structure of the metal oxide support.

Hereinafter, the hydrogenation mechanism of carbon dioxide according to one embodiment of the present disclosure will be described with reference to FIG. 2.

First, as shown in FIG. 2(*a*), carbon dioxide is adsorbed onto oxygen ($O_v$) vacancy sites of a metal oxide support such as cerium oxide or titanium oxide. Then, as shown in FIG. 2(*b*), the adsorbed carbon dioxide reacts with OH on the adjacent surface to form bicarbonates on the surface of the metal oxide support. In this case, $H_2$ molecules diffuse and dissociate on the copper nanoparticles 200 on the surface of the metal oxide support 100. At this time, the dissociated H atoms move along the amorphous shell 400 (FIG. 2(*c*))

Then, referring to FIG. 2(*d*), formates are formed by the dissociated hydrogen atoms supplied by moving through the amorphous shell 400, and as shown in FIG. 2(*e*), the formates turn into carbon monoxide which is then separated from the metal oxide support. Finally, as hydrogen is supplied again to OH at the sites from which carbon monoxide has been separated, water is formed and separated from the metal oxide support, thus forming oxygen vacancy sites ($O_v$) again.

Through the repetition of the cycle shown in FIGS. 2(*a*) to 2(*f*), the reverse water gas shift reaction continues to occur.

Hereinafter, examples of a complex oxide catalyst according to one embodiment of the present disclosure will be described.

EXAMPLES

Throughout the specification, "%" used to indicate the concentration of a specific substance may mean (weight/weight) % for solid/solid, (weight/volume) % for solid/liquid, and (volume/volume) % for liquid/liquid, unless otherwise specified.

Experimental Materials and Experimental Methods

Catalyst Synthesis

Cu-doped $CeO_2$ catalysts, denoted as xCC (x indicates atomic % of Cu), were synthesized by the co-precipitation method. 4.5 g of $Ce(NO_3)_3 \cdot 6H_2O$ (99.99%, Kanto Chemical) and a proper amount of $Cu(NO_3)_2 \cdot 3H_2O$ 98%, Sigma-Aldrich) were dissolved in 90 mL of deionized water. This solution was stirred for 30 min, and ammonia water (30%, Duksan) was added thereto dropwise until the pH reached 8.5. After the solution was stirred for 4 hours or more, the color thereof turned to deep green. This green slurry was filtered, washed with deionized water, and dried at 80° C. overnight. The dried samples were well ground to fine powder, and then calcined at 500° C. for 4 hours in air. Ni-, Co-, and Fe-doped solid solution catalysts were also synthesized in the same manner using Ni $(NO_3)_2 \cdot 6H_2O$, CO $(NO_3)_2 \cdot 6H_2O$, and $Fe(NO_3)_3 \cdot 9H_2O$ 99%, Sigma-Aldrich) as metal precursors.

For a control sample, Cu/$CeO_2$ with 23 atomic % of Cu, denoted as 23C/C, was synthesized by a wet-impregnation method. The bare $CeO_2$ support was synthesized using the same method without using a Cu precursor. $CeO_2$ was dispersed in deionized water, and an aqueous solution containing a proper amount of $CuCl_2$ (≥99.99%, Sigma-Aldrich) was added thereto dropwise. The final solution was stirred, dried at 80° C. overnight, well ground, and then calcined at 500° C. for 4 hours in air.

$CO_2$ Hydrogenation $CO_2$ hydrogenation was performed in a U-shaped quartz glass fixed-bed reactor with 50 mg of the catalyst loaded. Reduction pre-treatment was performed at 500° C. for 2 hours under 10% $H_2$ ($N_2$ balance). All the reactions were performed at atmospheric pressure at various $CO_2$:$H_2$ ratios. $N_2$ was also flowed as a calibration gas at a flow rate of 20 sccm. The total flow rate was 40 sccm and weight hourly space velocity (WHSV) was 48,000 mL/$g_{cat}$·h. The gas products were analyzed using an on-line gas chromatography (Younglin GC 6500) equipped with a packed bed carboxen 1000 column and a thermal conductivity detector (TCD). For the bench-scale reaction, 30 g of 23CC was ball-milled, and then a catalyst ink, composed of 35 wt % of the catalyst, 3 wt % of a binder (Disperal P2, Sasol), and a balance of deionized water, was prepared. Using this ink, a honeycomb monolith (1 inch in diameter and 1 inch in height) was coated with a catalytic amount (125 g/L) of the 23CC catalyst. The monolith was dried in a convection oven at 120° C. for 4 hours and annealed at 500° C. for 4 hours in air. This monolith was placed in a reactor, and then a reactant gas mixture (325 sccm of $CO_2$, 325 sccm of $H_2$, and 650 sccm of $N_2$) was injected into the reactor. The inlet gas was injected through a pre-heated furnace to avoid temperature drop.

In the present specification, the catalyst before heat treatment after drying at 80° C. for 8 hours in the synthesis method is denoted as Dry, the catalyst after heat treatment and before reduction treatment is denoted as Oxi or Oxide, and the catalyst after reduction treatment is denoted as Red or Reduced.

Characterization

TEM (Hitachi HF 5000) images with BF, DF, and SE modes were obtained to investigate the exact morphology of the catalysts at 200 kV. EDS mapping images were also obtained with the same instrument. The crystalline structures of the catalysts were investigated with a powder XRD (SmartLab, RIGAKU). The peak shift in the XRD pattern was monitored by HR-XRS in Pohang Light Source (PLS) 8D beamline. $H_2$-TPR were performed on a BELCAT II (MicrotracBEL) equipped with a TCD. The sample was pre-treated with Ar at 150° C. for 1 hour, and then the temperature increased to 800° C. with a ramping rate of 10° C./min. DRIFTS (Nicolet iS-50, Thermo Scientific) was performed with ZnSe window. 20 mg of the catalyst, which was previously reduced at 500° C. for 2 hours, was well mixed with 180 mg of KBr powder and loaded into the DRIFTS sample cup. After pre-treatment with Ar at 100° C. for 30 min, a gas mixture (4% $CO_2$, 12% $H_2$, and a balance of Ar) was flowed while the temperature increased up to 300° C. with a ramping rate of 5° C./min and maintained at 300° C. for 30 min. TPSR was performed on a BELCAT II using a mass spectrometer (BELMASS; MicrotracBEL). After 50 mg of the catalyst, which was previously reduced at 500° C. for 2 hour, was pretreated with Ar at 150° C. for 1 hour, a gas mixture (4% $CO_2$, 4% $H_2$, balance Ar) was flowed while the temperature increased to 600° C. with a ramping rate of 10° C./min. Raman spectra were collected by a FT-Raman spectrometer (Bruker) using a beam at 514 nm. In situ Raman spectra were obtained with the same instrument using a gas mixture (4% $CO_2$, 4% $H_2$, balance Ar) at a ramping rate of 20° C./min.

Example 1: Amorphous Shell Formation on Cu Nanoparticles

For reducible metal oxides such as $CeO_2$ and $TiO_2$, introducing heteroatoms could enhance surface oxygen mobility. Doping with transition metals such as Ni, Co, and Fe resulted in improved surface oxygen transfer. Here, transition metal-doped $CeO_2$ materials were prepared by the co-precipitation method explained in the Experimental Method. Their surface redox property was examined by $H_2$ temperature-programmed reduction ($H_2$-TPR).

As shown in FIG. 3, upon doping with Cu among Cu, Ni, Co, and Fe, large reduction peaks appeared at the lowest temperatures, indicating that surface oxygen species can be easily activated by reduction.

For these Cu-doped $CeO_2$ materials, solid solutions having various Cu contents were prepared and denoted as xCC (x: 3, 5, 14, 23, or 31) in which x indicates the atomic % of Cu. The results are shown in FIG. 4.

As shown in FIG. 4(*a*), when these CC materials were examined by X-ray diffraction (XRD) and high-resolution X-ray scattering (HR-XRS) without calcination or reduction, only the peaks for ceria were observed. As the Cu content increased, the peak shift became larger. Even the CC material with 31 atomic % of Cu could form a solid solution having a $CeO_2$ crystalline structure.

These CC materials were calcined in air and then reduced in $H_2$ at 500° C. As shown in FIG. 4(*b*), the $CeO_2$ (111) peak was shifted back to its original location, even though the Cu content increased after calcination.

After reduction, the amorphous shell 400 was formed, and as shown in FIG. 4(*c*), small CuO or Cu peaks appeared in 31CC, while the CC with lower Cu content did not show distinct Cu peaks.

On the other hand, bare $CeO_2$ was prepared first, and then Cu (23 atomic %) was deposited on the $CeO_2$ by a wet impregnation method; this material is denoted as 23C/C below.

As shown in FIG. 4(*d*), when this 23C/C was calcined and reduced under the same conditions, a very sharp CuO peak appeared in XRD. When the 23C/C was reduced, a very large Cu peak appeared, indicating that bulk Cu particles were formed on the surface.

That is, in the case of the catalyst of the present disclosure, it can be confirmed through the above XRD that copper particles were very uniformly mixed with $CeO_2$. Referring to FIG. 4(*a*), no peak for copper appeared, which means that copper was well incorporated mainly into the $CeO_2$ lattice structure. This is also explained by the shift of the Ce (111) peak in the dry XRD results. Referring to FIG. 4(*b*), when calcination was performed in air at 500° C. for 4 hours, small copper particles were segregated and separated to the surface, and in this process, the $CeO_2$ (111) peak shifted again. In the case of 31CC, a peak was observed in XRD because large copper particles appeared on the surface. Referring to FIG. 4(*c*), even after reduction, in the case of 23CC, no peak appeared, and in the case of 31CC, the peak for copper oxide changed to the peak of copper. That is, it can be seen that Cu nanoparticles were most uniformly present at around 23CC. That is, according to the experiment, it could be seen that Cu nanoparticles were most uniformly present at 14CC to 31CC, preferably at 23CC.

Among all the catalysts, the catalysts synthesized by the present inventors showed only peaks for very small copper particles. On the other hand, in the case of the control C/C catalyst synthesized by the method similar to previous studies (synthesis method: supporting copper on $CeO_2$), very large copper particles appeared even though the same amount of copper was used. According to the present disclosure, it is possible to synthesize a catalyst having uniformly small particles as described above, because the synthesis is performed by depositing very small copper particles on the surface.

FIG. 5 shows the results of performing $CO_2$ hydrogenation using 23CC or 23C/C at 600° C. for 90 hours. As shown in FIG. 5, 23CC showed higher CO2 conversion and better durability than 23C/C.

The surface reducibility was investigated with $H_2$-TPR for various Cu contents after calcination at 500° C.

The results are shown in FIG. 6.

As shown in FIG. 6(*a*), in the $H_2$-TPR results, three reduction peaks (α, β, and γ) appeared. Peak α at about 190° C. is assigned to the reduction of small $CuO_x$ clusters, peak β at about 210° C. to the reduction of surface lattice oxygen near Cu sites in the Cu—Ce solid solution, and peak γ at ≥400° C. to the reduction of bulk $CuO_x$ species. Whereas the 23C/C catalyst presented the peak γ, the CC catalysts had the peaks α and β only. Depending on the Cu content, the peak position and area varied. 23CC presented the reduction peaks at the lowest temperatures with a large amount of $H_2$ consumption.

$H_2$-TPR was performed again after reducing the CC catalysts under $H_2$ at 500° C. for 2 hours. As shown in FIG. 6(*c*), the 23CC presented large reduction peaks at about 230° C., indicating that the surface oxygens are still being extracted out, whereas the 23C/C barely showed the reduction peak. The BET surface areas of 23CC and 23C/C obtained after the reduction were 32.3 $m^2/g$ and 25.3 $m^2/g$, respectively, which were similar to each other.

Referring to the $H_2$-TPR results in FIG. 6(*a*), it can be confirmed that, as the amount of doping with copper increased, the peak was formed at a very low temperature compared to that for conventional $CeO_2$. As shown in FIG. 6(*a*), the peaks for the CC catalysts according to the present disclosure ended below 200° C. α, β and γ peaks appear; peak α is a peak for small $CuO_x$ species that are present on the surface and easily oxidized/reduced, peak β is a peak for the reduction of oxygen near surface-doped Cu, and peak γ appearing only in the control catalyst is a peak for the reduction of bulk CuO. Through the corresponding peak appearing only in the control catalyst, it was confirmed again that nano-sized copper nanoparticles could not be synthesized in catalyst synthesis through supporting. FIG. 6(*c*) shows the results of performing $H_2$-TPR again after reducing the catalyst at 500° C. Since the reduction was performed once, oxygen species were already consumed to some extent and the size of the peak decreased, but the position of the peak did not significantly change. This means that the size of the copper particles present on the surface did not increase, and that the copper particles were well and uniformly present even after reduction.

Raman spectroscopy was performed for the CC and 23C/C to investigate the surface oxygen vacancy.

As shown in FIG. 6(*b*), the peak at 465 $cm^{-1}$ indicates an octahedrally symmetrical vibration mode ($F_{2g}$) and the peak at 600 $cm^{-1}$ results from a defect-induced mode (D) of ceria. The ratio of peak area ($I_D/I_{F2g}$) was estimated to compare the surface defect sites for the various samples. As a result, all the CC presented much higher values than 23C/C or bare ceria.

The Raman spectra were obtained again after reduction at 500° C.

As shown in FIG. 6(*d*), the $I_D/I_{F2g}$ ratio decreased significantly after the reduction, but the CC still possessed a significant amount of defect sites unlike 23C/C. The surface oxygen of CC could be removed much more easily, and CC clearly had many surface defect sites, leading to shell formation.

FIGS. 6(*b*) and 6(*d*) are Raman spectra results for confirming the surface oxygen defect sites. Peak F is a peak commonly appearing in $CeO_2$, and peak D is a peak appearing due to a surface oxygen defect site in $CeO_2$. Concentrations of surface oxygen defects can be compared by comparing the intensities of peak F and peak D. Referring to FIG. 6(*d*), as can be seen from the oxide results, it can be confirmed that the $I_D/I_F$ value was significantly greater in copper-doped $CeO_2$ (3CC $I_D/I_F$=0.20; 5CC $I_D/I_F$=0.38; 14CC $I_D/I_F$=1.23; 23CC $I_D/I_F$=1.75; and 31CC $I_D/I_F$=1.81) than in the conventional $CeO_2$ support ($I_D/I_F$=2.0×$10^{-2}$). As a result of checking the results of the reduced samples after reduction, it can be confirmed that the surface oxygen defect sites greatly decreased, which proves that the oxygen defect sites act as a very important mediator in the formation of the shell.

Meanwhile, in the 23CC, Cu nanoparticles were most uniformly observed and the most amorphous shell was well formed. The catalyst obtained after maintaining the 23CC at 600° C. for 150 hours was examined by transmission electron microscopy (TEM) with bright field (BF), dark field (DF), and secondary electron (SE) modes, and energy dispersive spectroscopy (EDS) mapping.

The results are shown in FIG. 7. FIG. 7(*a*) shows TEM images of 23CC, FIG. 7(*b*) shows enlarged TEM images of 23CC, and FIG. 7(*c*) shows EDS mapping images of Cu and Ce.

As shown in FIG. 7, in the case of 23CC, small Cu nanoparticles having a size of 10 nm or less were observed. Interestingly, the Cu nanoparticles were encapsulated by amorphous shells. The SE mode in FIG. 7(*b*) demonstrates the morphology of the shell more clearly. Even in the case in which the existence of the shell was ambiguous in dark field mode, the shell was surely observed in SE mode.

Referring to FIG. 7(*c*), EDS mapping images confirmed that the inside of the metal oxide support consists of Ce and Cu, and Cu is mainly located inside the shell.

Example 2: Performance for $CO_2$ Hydrogenation $CO_2$ hydrogenation ($CO_2+H_2 \rightarrow COH_2O$) was performed using the CC catalysts. This reaction recently has received much attention as a scalable way for $CO_2$ reduction, which is essential to achieve carbon-neutral cycle. Whereas the precious metal-based catalysts often produced $CH_4$ from this $CO_2$ hydrogenation reaction, the CC or 23C/C catalysts produced CO only. Thermodynamic equilibrium composition was calculated using HSC chemistry software, considering CO as the only product.

The thermodynamically highest $CO_2$ conversion varies depending on the $CO_2:H_2$ ratio. For example, the highest value for $CO_2$ conversion at 600° C. is 38.4% for $CO_2:H_2$=1:1, but the value is 66.2% for $CO_2:H_2$=1:4. Typically, $CO_2$ conversion is high when excessive amounts of $H_2$ are used. However, using four folds of $H_2$ might not be advantageous because $H_2$, which is also a valuable chemical, would be wasted.

Referring to FIG. 8, when $CO_2$ hydrogenation was performed with a gas composition of $CO_2:H_2$=1:1, the 23CC showed the best performance, because it reached the thermodynamic limit of $CO_2$ conversion of 18.0% at 350° C. At temperatures higher than 350° C., the $CO_2$ conversion followed the thermodynamic limit.

However, the 23C/C presented significantly low activity for $CO_2$ conversion of 4.4% at 350° C. The same trend was observed for various $CO_2$:$H_2$ ratios. Whereas the 23CC followed the thermodynamic limit at 350° C. or higher regardless of the $CO_2$:$H_2$ ratio, the 23C/C showed significantly low small conversions, especially at lower temperatures below 500° C., and thus showed very low performance at low temperatures.

Meanwhile, the durability of 23CC and 23C/C was tested by long-term reaction at 600° C. for 150 hours. Because the catalysts would degrade more under a highly reducing condition, the long-term reaction was performed with $CO_2$:$H_2$=1:4, in addition to $CO_2$:$H_2$=1:1. The 23CC maintained the $CO_2$ conversion at 66.2% for $CO_2$:$H_2$=1:4, proving its superior durability. For 23C/C, however, the $CO_2$ conversion decreased from 60.8% to 54.0% for $CO_2$:$H_2$=1:4. CO selectivity was 100% and no coking was observed in all cases. Durability reaction was also performed at lower temperatures, in order to conduct the reactions under conditions that were not close to equilibrium. Durability test of 23CC was performed at 300° C., and 400° C. for 23C/C, as no activity was observed at 300° C. The durability of 23CC was again demonstrated at low temperature, as there was no decrease in reactivity.

Example 3: $CO_2$ Activation and $H_2$ Spillover $CO_2$ activation ability was firstly evaluated for 23CC and 23C/C through $CO_2$-TPD analysis. More $CO_2$ molecules attached on 23CC with stronger binding compared to 23C/C. The $CO_2$ hydrogenation on 23CC and 23C/C was also monitored using in-situ DRIFTS while flowing $CO_2$ and $H_2$ together (see FIGS. 9(*a*) and 9(*b*)). The peaks for formates or carbonates appeared at 1,700 to 1,200 $cm^{-1}$. When the spectra were obtained while the temperature increased from 25° C. to 300° C. and maintained at 300° C., the peaks for formates or carbonates were larger in 23CC than in 23C/C. This behavior can be observed more clearly in a two-dimensional demonstration (see FIG. 9(*c*)). Bicarbonates peaks appeared first at 1,609 $cm^{-1}$, 1,420 $cm^{-1}$, and 1,288 $cm^{-1}$ in the 23CC, showing that $CO_2$ is efficiently activated on the surface, and then carbonates and formates peaks increased further at 1,530 $cm^{-1}$ and 1,367 $cm^{-1}$ as the temperature increased. It is known that the bicarbonates intermediates appear prior to formate intermediates. Additionally, the absorbance for 23CC became negative at 2,900 to 3,500 $cm^{-1}$ in the temperature range of 100 to 200° C., implying the removal of surface hydroxyl groups and water molecules.

To further clarify the reaction intermediates on the catalyst surface, DRIFTS was performed at 300° C. while flowing $CO_2$ first, removing gaseous $CO_2$, and then flowing $H_2$ with increasing temperature (see FIG. 9(*c*)). When $CO_2$ was flowed, the peaks at 1,700 to 1,200 $cm^{-1}$ were larger in the 23CC than in the 23C/C. With $H_2$ flow, the peaks additionally appeared in the 23CC at 2,852 $cm^{-1}$, 2,122 $cm^{-1}$, and 1760 cm 1, indicating formates, CO adsorbed on metallic Cu, and $H_2$-spillover, respectively. These peaks were not observed in the 23C/C. When the temperature increased further to 400° C., the formate peak disappeared while the CO peak remained. In the 23CC, the surface intermediates formed upon $CO_2$ adsorption were converted into formates and CO upon $H_2$-spillover. The $CO_2$ is adsorbed to form bicarbonates, and then these intermediates turn into formates, finally producing CO.

Meanwhile, surface oxygen species on 23CC and 23C/C was investigated by near-ambient pressure X-ray photoelectron spectroscopy (NAP-XPS). Referring to FIG. 10, XPS O 1s spectra of the catalysts were obtained at a gas composition of $CO_2$:$H_2$=1:3 with increasing temperature. The peaks were deconvoluted into three peaks of lattice oxygen ($O_{latt}$, about 530.1 eV), surface-adsorbed oxygen ($O_{ads}$ about 532.2 eV) which typically indicates defective oxygen on the surface, and hydroxyl oxygen species ($O_w$, about 533.6 eV) including surface hydroxyl groups, reaction intermediates, and water. As the temperature increases, the $O_{ads}$ ratio decreased from 59.7% at room temperature to 34.2% at 150° C., and $O_w$ increased from 6.0% at room temperature to 19.0% at 150° C. for the 23CC, whereas the 23C/C showed much smaller changes. Compared to 23C/C, 23CC exhibited a higher concentration of surface oxygen species, which facilitated more efficient $H_2$ spillover. This resulted in the formation of a greater number of surface hydroxyl groups and reaction intermediates. 23CC demonstrated a significant enhancement in both $CO_2$ activation and $H_2$ spillover compared to 23C/C, which led to a high level of $CO_2$ hydrogenation.

Example 4: Bench-Scale Reaction $CO_2$ hydrogenation was performed in a bench-scale reactor to test the applicability of the 23CC in a larger process. First, 30 g of the 23CC was ball-milled to fine powder. Then, a catalyst slurry to coat the catalyst on a honeycomb monolith having a diameter and height of 1 inch was prepared. The catalyst loading was 125 g/L, and the actual catalyst dosage in the monolith was 1.6 g. The monolith was placed in a bench-scale tube reactor, and $CO_2$ hydrogenation was performed with a feed gas of 325 sccm $CO_2$, 325 sccm $H_2$, and 650 sccm $N_2$ (FIG. 11(*a*)). The WHSV of this condition was estimated as 48,507 mL/$g_{cat}$·h, which was similar to the condition used for a lab-scale reactor (48,000 mL/$g_{cat}$·h). The 23CC showed high activity and durability even in a bench-scale reaction (FIG. 11(*b*)). The $CO_2$ conversion was very close to the thermodynamic limit above 350° C. The discrepancy between the lab-scale reaction and the bench-scale reaction is often observed, but the 23CC catalyst showed the nearly same performance, proving its high potential for the actual application. The discrepancy between the lab-scale reaction and the bench-scale reaction is often observed, but the 23CC catalyst showed the nearly same performance, proving its high potential for actual application. Carbon monoxide was produced with 100% selectivity, and the repeated reactions up to 600° C. three times did not show any change. To increase the actual CO production, $CO_2$ hydrogenation by tripling the feed of reactants on both lab-scale and bench-scale was conducted. The actual CO productivity of the 23CC was compared for a lab-scale reaction and a bench-scale reaction (FIG. 11(*c*)). It increased by 32 times from 30.8 mmol/$g_{cat}$·h in the lab-scale to 984.9 mmol/$g_{cat}$·h on the bench-scale at a similar WHSV of 144,000 mL/$g_{cat}$·h. The CO production rate was also compared with the literature values (Table 1). The 23CC presented a record-high value in terms of actual CO production rate. This non-precious metal catalyst synthesized by a facile and scalable method can be promising for thermal $CO_2$ reduction in a large-scale process.

TABLE 1

| Ref | Catalysts | $H_2/CO_2$ ratio | Reaction temperature | WHSV ($mL/g_{cat} \cdot h$) | $CO_2$ conversion (%) lab | $CO_2$ conversion (%) bench | $CO_2$ conversion rate ($mmol \cdot g_{cat}^{-1} h^{-1}$) lab | $CO_2$ conversion rate ($mmol \cdot g_{cat}^{-1} h^{-1}$) bench | CO $flow_{out}$ ($mmol \cdot h^{-1}$) lab | CO $flow_{out}$ ($mmol \cdot h^{-1}$) bench |
|---|---|---|---|---|---|---|---|---|---|---|
| This work | 23CC | 1 | 250 | 144000 | 3.0 | 2.1 | 47.7 | 34.1 | 2.4 | 54.6 |
| | | | 300 | (for bench | 7.4 | 6.6 | 118.5 | 108.0 | 5.9 | 172.7 |
| | | | 350 | reaction, | 16.7 | 13.7 | 268.5 | 224.4 | 13.4 | 359.0 |
| | | | 400 | 145521) | 22.7 | 21.4 | 365.1 | 348.7 | 18.2 | 557.9 |
| | | | 450 | | 27.1 | 25.8 | 436.2 | 420.5 | 21.8 | 672.8 |
| | | | 500 | | 31.3 | 30.4 | 502.9 | 495.6 | 25.1 | 793.0 |
| | | | 550 | | 35.0 | 34.3 | 562.6 | 560.1 | 28.1 | 896.1 |
| | | | 600 | | 38.4 | 37.7 | 616.9 | 615.6 | 30.8 | 984.9 |
| 2 | $PtCo/CeO_2$ | 2.8 | 300 | 3000 | 9.1 | — | 48.7 | — | 4.9 | — |
| 3 | $Pt/TiO_2$ | 1.4 | | 12000 | 10 | — | 3.5 | — | 1.7 | — |
| 4 | 0.3CuMgAl—LDH | 4 | | 6000 | 21 | — | 8.4 | — | 1.7 | — |
| 5 | $CuCeO_x$ | 3 | | — | 18 | — | 6.6 | — | 1.3 | — |
| 6 | 1Rh/10FC | 1 | 350 | 240000 | 13.2 | — | 217.8 | — | 10.9 | — |
| 7 | $Ni/a—TiO_2$ | 4 | | 15000 | 5 | — | 6.4 | — | 2.5 | — |
| 8 | Pt—K/Mullite | 1 | | 30000 | 8.5 | — | 45 | — | 4.5 | — |
| 9 | $NiFe_{0.9}/ZrO_2$ | 2 | 400 | 24000 | 18.6 | — | 24.9 | — | 2.5 | — |
| 10 | $1Pd—La_2O_3/MWCNT$ | 3 | | 72000 | 19.5 | — | 22.3 | — | 1.1 | — |
| 11 | $Pd/TiO_2—0.01$ | 4 | | 11000 | 20.1 | — | 18.0 | — | 0.9 | — |
| 12 | $Pt/CeO_2—AA$ | 3 | 450 | 72000 | 33 | — | 169.2 | — | 8.5 | — |
| 13 | $0.75Fe0.25Cu/CeO_2—A1_2O_3$ | 4 | 500 | 30000 | 56 | — | 114.5 | — | 5.7 | — |
| 14 | $CuSiO/CuO_x$ | 3 | | 60000 | 17.8 | — | 114.4 | — | 2.3 | — |
| 15 | $In_2O_3—CeO_2$ | 0.5 | | 48000 | 30 | — | 107.1 | — | 5.35 | — |
| 6 | 1Rh/10FC | 1 | 600 | 240000 | 38.3 | — | 992.4 | — | 49.6 | — |
| 16 | Pd—In/SiO2 | 1 | | 60000 | 30 | — | 146.4 | — | 7.3 | — |
| 17 | $Cu—Cs—Mo_2C$ | 4 | | 12000 | 64 | — | 64.3 | — | 16.1 | — |
| 18 | Cu—Al spinel | 2 | | 30000 | 47 | — | 644.4 | — | 6.4 | — |
| 19 | $Cu\beta—Mo_2C$ | 2 | | 300000 | 38 | — | 1696.3 | — | 36.6 | — |
| 20 | $BaZr_{0.8}Y_{0.16}Zn_{0.04}O_3$ | 1 | | 2400 | 38 | — | 20.1 | — | 10.0 | — |
| 21 | $Ni/nSiO_2$ | 1 | | 400000 | 60 | — | 164.3 | — | 2.5 | — |

As shown in Table 1 above, the 23CC showed a record-high CO production rate. This non-precious metal catalyst synthesized by a facile and scalable method can be promising for thermal $CO_2$ reduction in a large-scale process.

The advantage of a catalyst having a shell structure is that it exhibits high durability because the shell maintains the small copper structure. The RWGS reaction is performed in a reducing hydrogen atmosphere, which causes agglomeration of metal particles on a general supported catalyst. The shell structure prevents this agglomeration.

CONCLUSION

Cu-doped $CeO_2$ (CC) significantly promoted surface oxygen transfer, forming oxygen defects more easily than Cu deposited on bare $CeO_2$ (C/C). Upon reduction, amorphous shells were formed on small Cu nanoparticles on the CC, whereas Cu in C/C was sintered into large particles. This behavior was observed in these non-precious catalysts by enhancing surface oxygen transfer, although oxide shell formation on metal nanoparticles has previously been reported only in precious metal catalysts. $CO_2$ hydrogenation was performed on the CC catalysts, and only CO was produced from low temperature. Especially, CC with 23 atomic % of Cu (23CC) showed a high CO production rate in all temperature ranges, following the thermodynamic equilibrium limit above 350° C. This catalyst also showed high durability for long-term reaction at 600° C. for 150 hours. The promoted surface defects enabled $CO_2$ activation and $H_2$ spillover more efficiently, as confirmed by in-situ DRIFTS and TPSR. The 23CC catalyst was applied even in a bench-scale reactor and showed a record-high CO production rate. This encapsulated non-precious metal catalyst is expected to be applied for $CO_2$ reduction in a massive scale.

Although the embodiments of the present disclosure have been described in more detail with reference to the accompanying drawings, the present disclosure is not necessarily limited to these embodiments, and various modifications can be made without departing from the technical idea of the present disclosure. Therefore, the embodiments described above are not intended to limit the technical idea of the present disclosure, but are intended to explain the present disclosure, and the scope of the technical spirit of the present disclosure is not limited by these embodiments. Therefore, it should be understood that the embodiments described above are illustrative in all respects and not restrictive. The scope of protection of the present disclosure should be defined by the following claims, and all technical ideas within the scope equivalent thereto should be construed as being included in the scope of the present disclosure.

What is claimed is:

1. A complex oxide catalyst comprising a metal oxide support and copper, wherein the copper is present as particles on a surface of the catalyst, and wherein each of the particles is encapsulated by a shell composed of the metal oxide support.

2. The complex oxide catalyst of claim 1, wherein the metal oxide is $TiO_2$ or $CeO_2$.

3. The complex oxide catalyst of claim 1, wherein the copper in the particles comprises copper oxide.

4. The complex oxide catalyst of claim 1, wherein the shell exhibits gas permeability.

5. The complex oxide catalyst of claim 1, wherein the copper is present in a $CeO_2$ lattice structure.

6. A catalyst ink composition comprising the complex oxide catalyst of claim 1.

7. A method for producing a complex oxide catalyst, the method comprising steps of:

(a) dissolving a metal oxide precursor and copper precursor in water;

(b) adjusting a pH of the solution to 8 to 9 and stirring the pH-adjusted solution to form a precipitate;

(c) drying the precipitate to form a solid solution;

(d) calcining the solid solution; and (e) reducing the calcined solid solution under a hydrogen atmosphere.

8. The method of claim 7, wherein the metal oxide precursor is cerium oxide or titanium oxide.

9. The method of claim 7, wherein 5 to 50 mg of the copper precursor is dissolved in 90 ml of water.

10. The method of claim 7, wherein the stirring in step (b) is performed for 3 to 10 hours.

11. The method of claim 7, wherein the calcining in step (d) is performed at a temperature of 400° C. to 600° C.

12. The method of claim 7, wherein the calcining in step (d) is performed for 2 hours to 6 hours.

* * * * *